United States Patent [19]
Horiuchi et al.

[11] 3,947,739
[45] Mar. 30, 1976

[54] REGENERATIVE BRAKING CONTROLLER FOR A DC MOTOR

[75] Inventors: Michimasa Horiuchi, Mito; Hiroshi Narita, Katsuta, both of Japan

[73] Assignee: Hitachi, Ltd., Japan

[22] Filed: Aug. 28, 1973

[21] Appl. No.: 392,296

[30] Foreign Application Priority Data
Aug. 30, 1972 Japan............................ 47-86216

[52] U.S. Cl. ............................................... 318/376
[51] Int. Cl.² ........................................... H02P 3/14
[58] Field of Search .......... 318/258, 269, 370, 371, 318/373, 376, 377, 380, 381; 307/239, 240

[56] References Cited
UNITED STATES PATENTS

| | | | |
|---|---|---|---|
| 3,593,089 | 7/1971 | Appelo | 318/370 |
| 3,597,669 | 8/1971 | Soltz | 318/373 X |
| 3,793,578 | 2/1974 | Rettig | 307/240 X |

Primary Examiner—Robert K. Schaefer
Assistant Examiner—W. E. Duncanson, Jr.
Attorney, Agent, or Firm—Craig & Antonelli

[57] ABSTRACT

A regenerative braking controller for use with a series-wound DC motor which drives an electric car for railways or electric automobile and which is controlled by a thyristor chopper comprises a series-connected circuit including an armature of the DC motor, a field winding thereof and a smoothing reactor, a chopper connected in parallel with said series-circuit, a diode connected between said parallel circuit and a power supply, and a gate controller for applying a gate signal to said chopper in succession only during a period of time when said chopper is to be rendered conductive.

8 Claims, 22 Drawing Figures

REGENERATIVE BRAKING CONTROLLER FOR A DC MOTOR

This invention relates to a device for controlling the regenerative braking of a DC motor, particularly to such a device used with the thyristor controlled DC series motor.

Usually, a series-wound DC motor is employed for driving an electric car for railways from a point of view of torque characteristics. The control of torque and speed has been effected by resistors and contactors for inserting the resistors to the motor circuit.

The controlling by the resistors, however, can effects no continuous control and has the disadvantage of great power loss in the resistors.

To overcome these disadvantages, recently, a device for controlling the DC motor by a thyristor chopper has been proposed and is now in practical use.

The device for controlling the DC motor by a thyristor chopper can effect continuous control over the whole range of control and thus provides comfortable riding for the passengers with the additional advantage of reduced power loss.

In a railway system in which cars are driven by thyristor controlled motors, it is common practice for the cars to be equipped with a regenerative braking system. According to the regenerative braking, electric power is retrieved from the running car during braking operation, as is explained in detail hereinafter.

However, adoption of the rengenerative braking system involves problems to be solved, which are also explained hereinafter.

The main object of this invention is to overcome such problems and provide a regenerative braking controller for a DC motor capable of effecting smooth regenerative braking.

Another object of the present invention is to provide a regenerative braking controller for a DC electric motor permitting a gate transformer to be made small-sized. The present invention is characterized primarily in that a regenerative controller for use with a DC motor controlled by the thyristor chopper comprises a series-connected circuit including an armature of the DC motor, a field winding thereof and a smoothing reactor, a chopper connected in parallel with said series-circuit, a diode connected between said parallel circuit and a power supply, and a gate controller for applying a gate signal to said chopper in succession only during a period of time when said chopper is to be rendered conductive.

Other features will become apparent when the following descriptions are read with reference to the accompanying drawings.

FIG. 1 shows one form of a circuit which has been in practical use for effecting regenerative braking of an electric car for railways.

Figure 1:
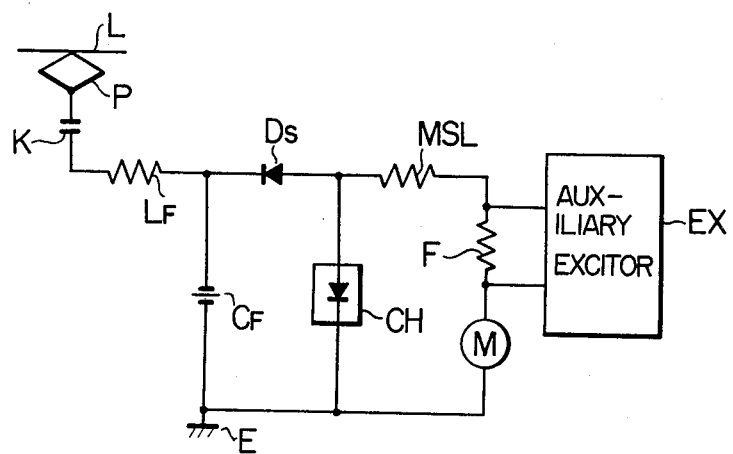
FIG. 1 is a main circuit diagram for effecting regenerative braking of a DC motor to which the present invention is applicable.

In FIG. 1 there are shown a trolley wire L, a pantograph P, and a circuit breaker K which supplies loads with the catenary or line voltage upon the closing thereof. It is to be noted that there is shown no high speed circuit breaker for effecting protective operation upon failures in commutation of a chopper CH. A reactor $L_F$ and a capacitor $C_F$ constitute a filter for reducing fluctuating of line voltage or current resulting from the on-off control of the chopper CH. MSL designates a smoothing reactor for reducing fluctuation of motor voltage or current resulting from the on-off control of the chopper CH, M an armature of the motor, F a series-wound field winding, E the ground or the earth, Ds a diode for preventing current from flowing reversely from the trolley wire L to the ground when the chopper CH is turned on, and EX an auxiliary excitor.

Figure 2:
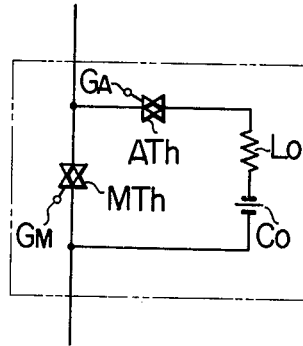
FIG. 2 is a circuit diagram showing one arrangement of a thyristor chopper.

FIG. 2 shows a particular circuit arrangement of the chopper CH comprising a main thyristor MTh, a commutating thyristor ATh, a commutating reactor Lo and a commutating capacitor Co. The main thyristor MTh and the commutating thyristor ATh are of a reverse conduction type incorporating the diodes therein and they have gate terminals $G_M$ and $G_A$.

The application of a gate signal to the gate terminal $G_M$ of the main thyristor causes the main thyristor MTh or the chopper CH to be turned on. A gate signal is applied to the gate terminal $G_A$ of the commutating thyristor ATh in a state where the main thyristor is turned on to render the commutating thyristor ATh conductive. The turning on of the commutating thyristor ATh causes commutating current to flow through a closed circuit Co-Lo-ATh-MTh-Co, whereupon its reverse current is produced to turn off the main thyristor MTh as well as the commutating thyristor ATh, namely, the chopper CH. Let $T_1$ be an on-period of the chopper CH and T be a period of one control operation cycle, then the duty factor $\alpha$ of the chopper is expressed at $T_1/T$.

Figure 3:
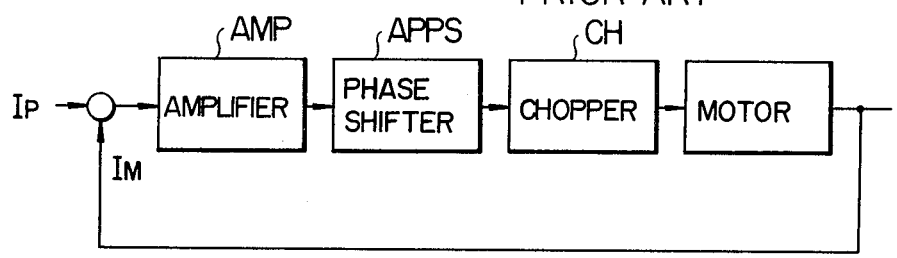
FIG. 3 is a fundamental block diagram for regenerative braking control.

The regenerative braking is effected by the circuit shown in FIG. 1 in such a way that instructed current level $I_p$ is compared with actual motor current $I_M$ as shown in a control block diagram of FIG. 3, the error signal derived therefrom being applied through an amplifier AMP to a control input of a phase shifter APPS to generate therefrom an output signal for controlling the duty factor α of the chopper CH.

Figure 4:
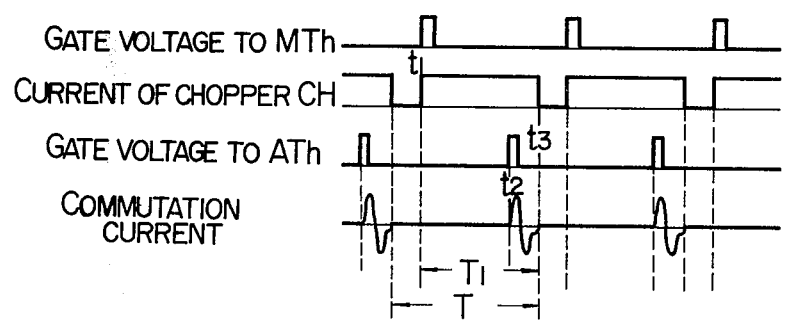
FIG. 4 is a view showing operational waveforms of the chopper.

The regenerative braking will be more fully described in conjunction with operational waveforms of the chopper CH as shown in FIG. 4.

At a time $t_1$, the gate signal is applied to the gate terminal $G_M$ of the main thyristor MTh to turn on the chopper CH, thereby short-circuiting a series circuit including the armature M of the electric motor, the field winding F and the smoothing reactor MSL.

Thus, a closed circuit is established through M-F-MSL-CH-M. This causes the motor current to increase gradually with power stored in the smoothing reactor MSL depending on the time constant of the closed circuit and characteristics of the motor.

At a time $t_2$, the gate signal is applied to the gate terminal $G_A$ of the commutating thyristor ATh to turn on the latter. The turning on of the commutating thyristor ATh permits the commutation current to flow as mentioned earlier, to turn off the chopper CH at a time $t_3$.

When the chopper CH is turned off, the motor current flows through a closed circuit M-F-MSL-Ds-$L_F$-K-P-L-E-M, the power being constituted mainly of energy released from the smoothing reactor MSL. In other words, at the turning off of the chopper CH, the power flows as regenerative current from the motor to the trolley wire L. Thus, during the turning off of the chopper CH, the regeneration of power is effected while the motor current is gradually reduced at a rate depending on the time constant of the circuit, the electromotive force of the motor and the catenary voltage.

Thereafter, the turning on and off of the chopper CH and accordingly control of the duty factor is effected in a repetitive manner to effect the regenerative braking control.

It is a usual practice that in effecting the regenerative braking control of the DC motor in the above-mentioned manner, the gate signals are usually applied to the thyristors constituting the chopper CH through a gate transformer. The reason is to provide electrical isolation to the gate control circuit adapted for use in a low voltage circuit because the chopper CH is in a high voltage circuit.

The power capacity of the gate transformer is determined by a product of the voltage by the time. More specifically, it is determined by the peak value of voltage of the gate signal and its duration. For this reason, conventionally the gate pulse is made to have a narrow width just enough to fire the thyristor as shown in FIG. 4 in order to allow use of small gate transformers.

Figure 5:
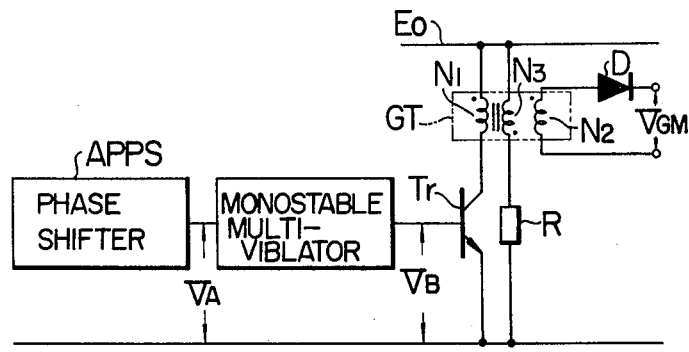
FIG. 5 is a view showing one arrangement of a prior art gate controller.

FIG. 5 shows one embodiment of a gate controller which has conventionally been in use. In the following, the gate transformer for the main thyristor MTh will be described.

In FIG. 5 there are shown a gate transformer GT, an input winding $N_1$ to which a switching transistor Tr is connected in series, an output winding $N_2$ from which a gate signal voltage $V_{GM}$ is taken out through a diode D at the gate terminals of the main thyristor MTh, a resetting winding $N_3$ to which a resistor R is connected, and a DC power line Eo. It is to be noted that the small dots at the windings indicate starting points from which the windings are wound.

Figure 6:
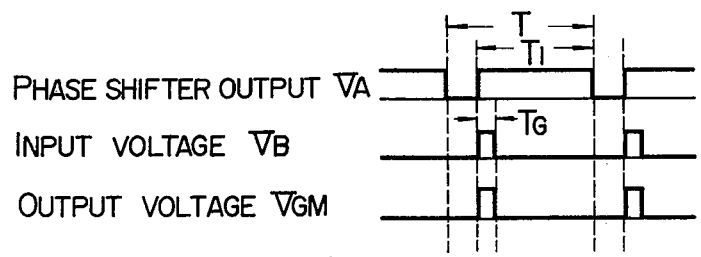
FIG. 6 is a view showing operational waveforms thereof.

The gate transformer GT shown in FIG. 5 is described in detail in the specification of the Japanese Patent No. 665896. The operation of the transformer will be briefly described in connection with FIG. 6.

An output $V_A$ from the phase shifter APPS is converted to a pulse having a predetermined duration $T_G$ and voltage $V_B$ by a monostable multivibrator. The output voltage $V_B$ of the monostable multivibrator is applied to the base of the transistor Tr to turn on the latter. The turning on of the transistor Tr causes a voltage Eo applied to the input winding $N_1$ to induce a voltage in the output winding $N_2$. The voltage $V_{GM}$ from the output winding $N_2$ serves as a gate signal which is applied to the gate terminal $G_M$ of the main thyristor MTh. The pulse duration of the signal $V_{GM}$ is equal to that of the output signal $V_B$ from the monostable multivibrator. It is to be noted that the resetting winding $N_3$ serves to reset the magnetic flux to a predetermined bias value when the transistor is turned off, the bias amount being adjusted by the resistor R.

However, a problem has been found to be encountered at initial stage of the start of the regenerative braking. In the following, the problem will be described in details.

During the regenerative braking the motor acts as a series-wound generator. The generated voltage $E_M$ from the motor relies only on the residual magnetic flux and hence is very small when the braking circuit is contructed by being converted from power running circuit. To meet this problem, the field winding F is energized by the auxiliary excitor EX. The auxiliary excitation is effected in such a way that four series-connected motors, for example, generate a voltage of about 100 V at the car speed of 100 kilometers per hour. On the other hand, inductance L of the smoothing reactor MSL for smoothing the motor current has a value of 10 to 15 mH at the catenary voltage Vs of 1500 volts in order to prevent the main thyristor MTh or the motor from undergoing damages resulting from the excessive current due to the failure in commutation of the main thyristor CH.

Assuming, for example, that the car speed is 30 kilometers per hour at the beginning of the regenerative braking, the voltage $E_M$ generated from the motor with the auxiliary excitation amounts to 30 volts.

Thus, a rising rate $di/dt$ of the chopper current when the chopper CH is turned on is given by $$di/dt \approx \frac{E_M}{L} = \frac{30 \,[\text{volts}]}{10 \text{ to } 15 \,[\text{mH}]} = 3 \text{ to } 2 \,[\text{A/ms}]$$

The pulse duration of the gate signal to the main thyristor MTh is set to about 500 μs by the gate transformer GT as shown in FIG. 5. The chopper current $I_{CH}$ amounts to $$di/dt \times T_G = 2 \text{ to } 3 \,[A/ms] \times 0.5 \,[ms] = 1 \text{ to } 1.5 \,[A]$$

before the gate voltage disappears. This current flows through the main thyristor MTh.

Figure 7:
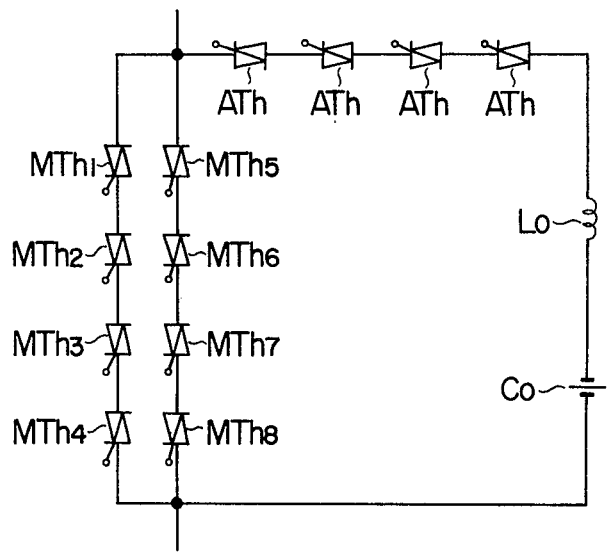
FIG. 7 is a view showing a particular arrangement of the thyristor chopper.

It is common practice that the chopper CH has two main thyristors MTh connected in parallel as shown in FIG. 7 for the reason of its current capacity. Further a plurality of main thyristors are connected in series in each branch from the point of view of breakdown voltage. FIG. 7 shows the main thyristor MTh having eight thyristor elements connected in parallel and in series. For convenience of explanation, each thyristor element is given a suffix number of 1 to 8. Thus, the two parallel-connected circuits are supplied with the current of 0.5 to 0.75 A per each branch circuit.

On the other hand, the element of, for example, 1000 V and 300 A requires latching current (the current required to maintain the turned-on thyristor after the gate voltage has disappeared) of 0.5 A to 1 A. Consequently, a difference between the current characteristics of the thyristor elements in the main thyristor MTh tends to result in the breakdown of the thyristor element.

Figure 8:
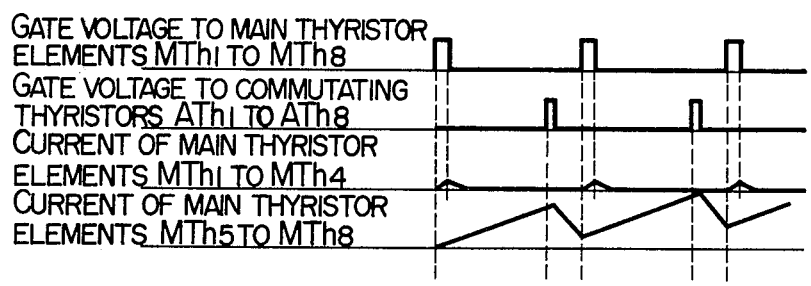
FIG. 8 is a view showing operational waveforms of the chopper shown in FIG. 7.

FIG. 8 shows waveforms in which the different latching current exists between the two parallel-connected circuits of the main thyristor MTh. In such a state, the thyristor elements $MTh_1$ to $MTh_4$ are supplied with no current upon disappearance of the gate voltage, while the thyristor elements $MTh_5$ to $MTh_8$ continue to be supplied with current because of their small latching current. This causes the current to be concentrated on the series-connected circuit including the thyristor elements $MTh_5$ to $MTh_8$, thus resulting in excessive current.

Figure 9:
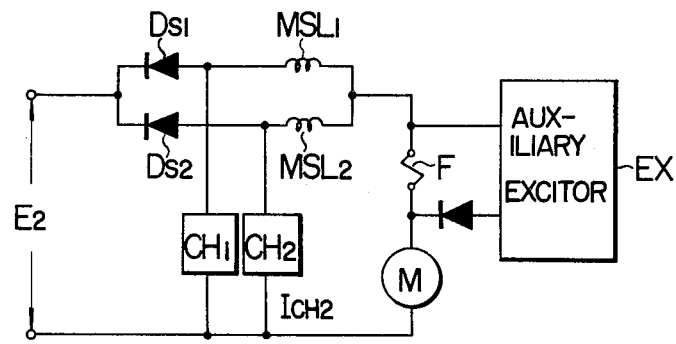
FIG. 9 is a main circuit diagram for regenerative braking in which two choppers are employed.

Further, as shown in FIG. 9, two sets of choppers $Ch_1$ and $Ch_2$ are provided to control the DC motor of the electric car with the phase difference of 180° between the operation of choppers $CH_1$ and $CH_2$ in order to make small the capacities of the smoothing reactor MSL and the filter including the reactor $L_F$ and the capacitor $C_F$ for reducing the fluctuation. This arrangement causes the pulsation frequency of the line current and the motor current to be twice as great as that of the arrangement in which one set of chopper is provided, thereby permitting the capacity of the filter or smoothing reactor to be made small.

Figure 10:
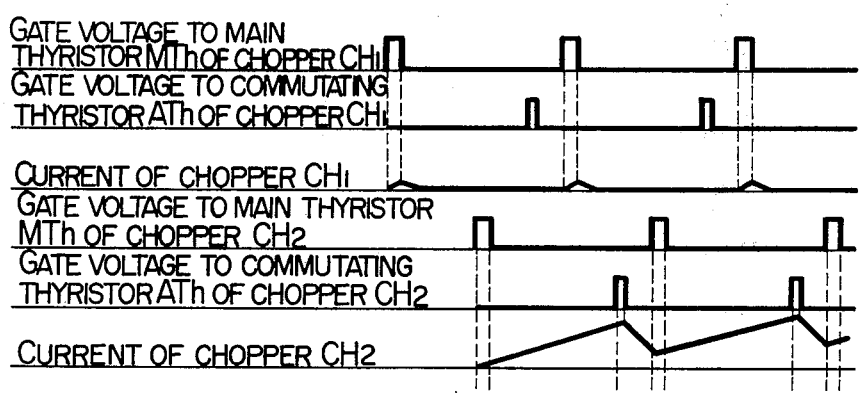
FIG. 10 is a view showing operational waveforms thereof.

In FIG. 10 there is shown the case where the main thyristors MTh of the choppers $CH_1$ and $CH_2$ in FIG. 7 have the different latching current. The chopper $CH_1$ has the chopper current $I_{CH_1}$ reduced to zero as the gate voltage $V_{GM_1}$ disappears while the chopper $CH_2$ has the chopper current $I_{CH_2}$ continuing to flow until the chopper $CH_2$ is turned off even after the disappearance of the gate voltage $V_{GM_2}$. The current is, therefore, concentrated on the chopper $CH_2$ with the result that the main thyristor MTh of the chopper $CH_2$ is broken-down.

In order to prevent the breakdown of such a main thyristor, there is proposed a system with which the unbalance of the current existing between the two branch circuits or choppers are detected and the choppers are cut off. This, however, results in stopping of the chopping function and the regenerative braking control.

Alternatively, there may be proposed a system in which all the thyristor elements of the main thyristors have an identical latching current characteristics. This however, disadvantageously results in an increased production cost because of the high price of such thyristors.

Further, there may be proposed another system in which the voltage generated from the motor with the auxiliary excitation is increased to enhance the current flowing through the main thyristor. However, the current flowing through the thyristors or choppers is not always divided equally because of the non-uniformness of the resistors and inductances. Furthermore, an auxiliary excitor of great capacity is required to effect smooth regenerative braking even at a low motor speed. There is, however, a limit in making such a large excitor in view of the capacity of the power supply installations on the car.

In order to overcome the above problems, according to the present invention, the gate signal is continuously applied to the main thyristor of the chopper during a period of time when the main thyristor is to be rendered conductive.

Figure 11:
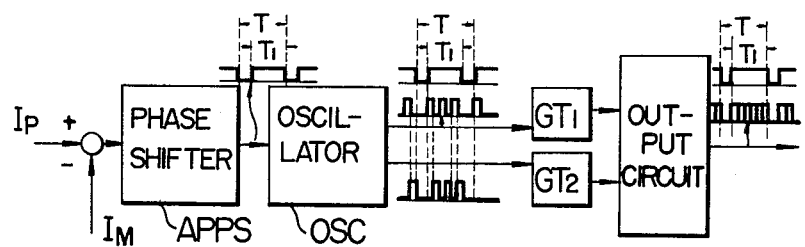
FIG. 11 is a view showing a fundamental arrangement of a gate controller according to the present invention.

In FIG. 11 there is shown an arrangement of a gate controller for applying continuous gate signals to the main thyristor.

In FIG. 11 an oscillator OSC is driven by an output from the phase shifter APPS which sets the duty factor of the chopper CH. The output pulses from the oscillator appear alternately at two output terminals thereof. The pulse is applied alternately to the gate thereof. The pulse is applied alternately to the gate transformers $GT_1$ and $GT_2$, the output voltages from which are added in the output circuit to produce a gate pulse which continues during a period of time (for example, $T_1$) when the chopper is to be turned on.

Figure 12:
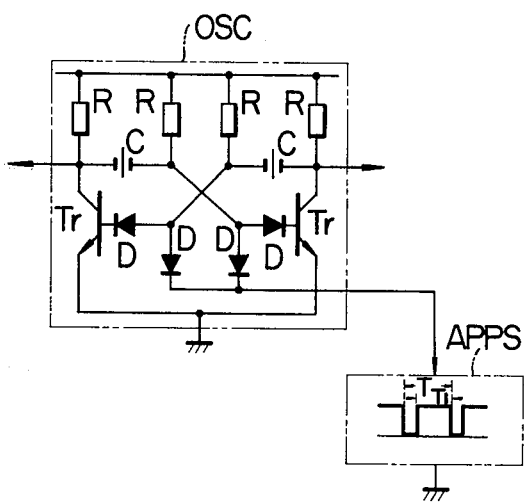
FIG. 12 is a circuit diagram showing one arrangement of an oscillator.

For the oscillator may be used a well known astable multivibrator as shown in FIG. 12 including transistors Tr, capacitors C, resistors R and diodes D.

With this arrangement, the oscillator provides no oscillation at zero output of the phase shifter APPS because the two transistors have their base connected to the ground. The output from the phase shifter is applied to the bases of the two transistors Tr, whereupon the transistors are alternately turned on and off. Thus the pulse signals having the phase different by 180° as shown in FIG. 11 are generated at the collectors of the two transistors Tr. The oscillation frequency of the oscillator is set at, for example, 5 $KH_z$.

Figure 13:
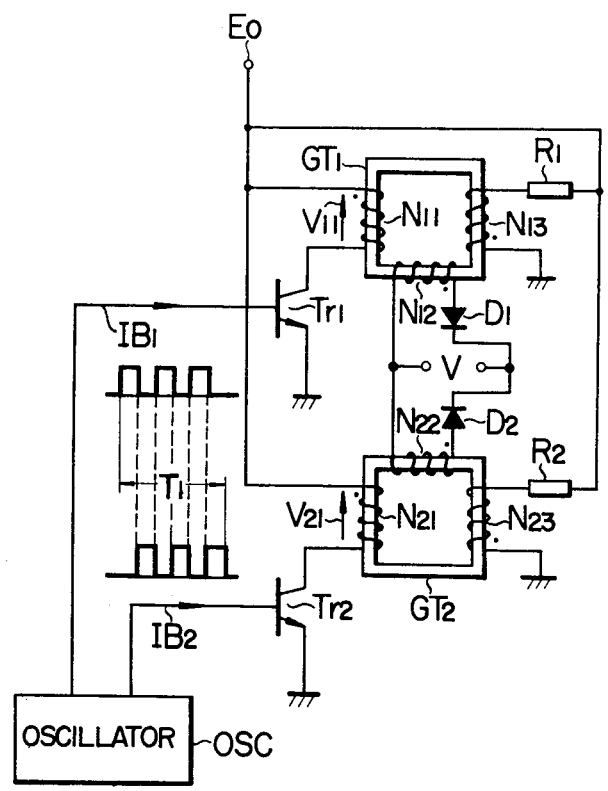
FIG. 13 is a view showing a particular arrangement of essential parts of the gate controller.
Figure 14:
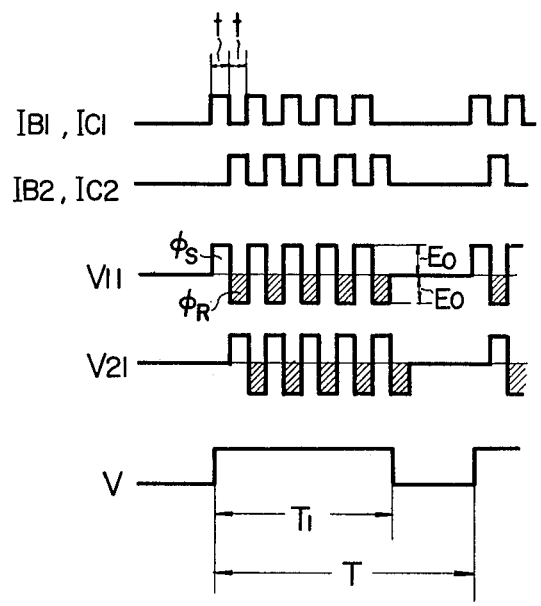
FIGS. 14 to 16 are views showing operational waveforms thereof.
Figure 15:
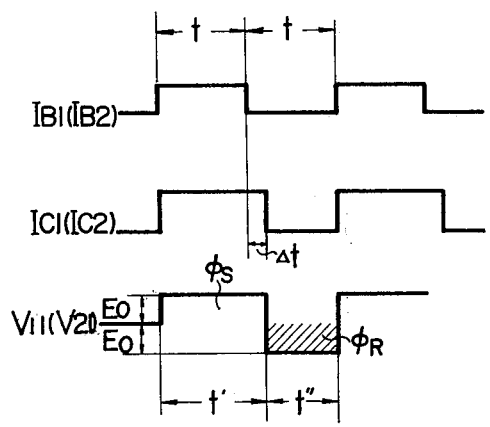

The gate controller will be in more detail described in conjunction with FIG. 13.

In FIG. 13 the same reference marks as those in FIG. 12 indicate corresponding elements. The gate transformers $GT_1$ and $GT_2$, primary windings (input windings) $N_{11}$ and $N_{21}$ and transistors $Tr_1$ and $Tr_2$ serving as a switching transistors constitute series connected circuits, respectively, which are connected to the DC power supply Eo. Secondary windings (output windings) $N_{12}$ and $N_{22}$ produce output voltages which are added through the diodes $D_1$ and $D_2$. Tertiary windings (resetting windings) $N_{13}$ and $N_{23}$ are connected in series with resistors $R_1$ and $R_2$ and further connected to a DC power supply V.

With this arrangement, assuming that winding ratios of the primary windings $N_{11}$ and $N_{21}$ to the third windings $N_{13}$ and $N_{23}$ are chosen so as to be $N_{11} = N_{21} = N_{13} = N_{23}$, and neglecting a turn-off delay time of the transistors $Tr_1$, $Tr_2$, the base currents $I_B$ and $I_B$ of the transistors $Tr_1$ and $Tr_2$ have the same duration as the collector currents $I_{C_1}$ and $I_{C_2}$. The voltages $V_{11}$ and $V_{21}$ on the primary windings $N_{11}$ and $N_{21}$ of the gate transformers have the same pulse width and level in the set as well as reset state, so that the product of the voltage by the time, i.e., set and reset magnetic fluxes are $E_ot$ and $\phi_s = \phi_R$.

As mentioned above, the gate controller has been briefly decribed but it will be described in detail later by way of another embodiment.

It will be appreciated that a gate pulse which continues during the period of time when the chopper is to be turned on is generated with the simple and inexpensive arrangement.

In the description relative to FIG. 13, the turn-off delay time of the transistors $Tr_1$ and $Tr_2$ has been neglected but it must be studied in order to effect excellent controls. In the following, the delay time will be described.

Figure 16:
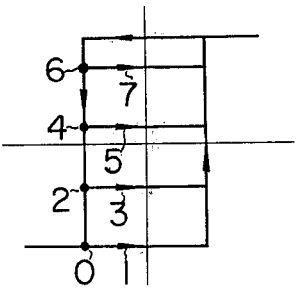

The delay time of the transistor $Tr_1$ (or $Tr_2$) causes the duty period of the base current $I_{B_1}$ (or $I_{B_2}$) to deviate from that of the collector current $I_{C_1}$ (or $I_{C_2}$), thus resulting in the lengthened duration of pulse in the collector current. Therefore, also as regards the voltage $V_{11}$ (or $V_{21}$) on the primary winding of the gate transformer, the setting period of the magnetic flux in the iron core becomes longer than the resetting period thereof with the result that the set magnetic flux $\phi_s$ ($E_o t'$) is greater than the reset magnetic flux $\phi_R$ ($E_o t''$). Referring to the hysteresis characteristics of the iron core in FIG. 16, the magnetic flux starting from point 0 and set by way of path 1 can not be returned to the point 0 at the resetting because $\phi_s$ is greater than $\phi_R$, thus terminating at a point 2. In this case, the amount to be balanced for resetting is $\Delta t E_o$. Next, the setting is effected passing through line 3, but the magnetic flux never returns to the point 2, terminating in a point 4 with the result of the amount to be balanced of $2\Delta t E_o$. The thus repeated operation results in no generation of the required output, as the magnetic flux in the iron core is saturated.

In this case, it will be appreciated that, in order to prevent the magnetic flux from being saturated, the voltage developed on the tertiary winding $N_{13}$ (or $N_{23}$) is increased to balance the set and reset magnetic fluxes.

Figure 17:
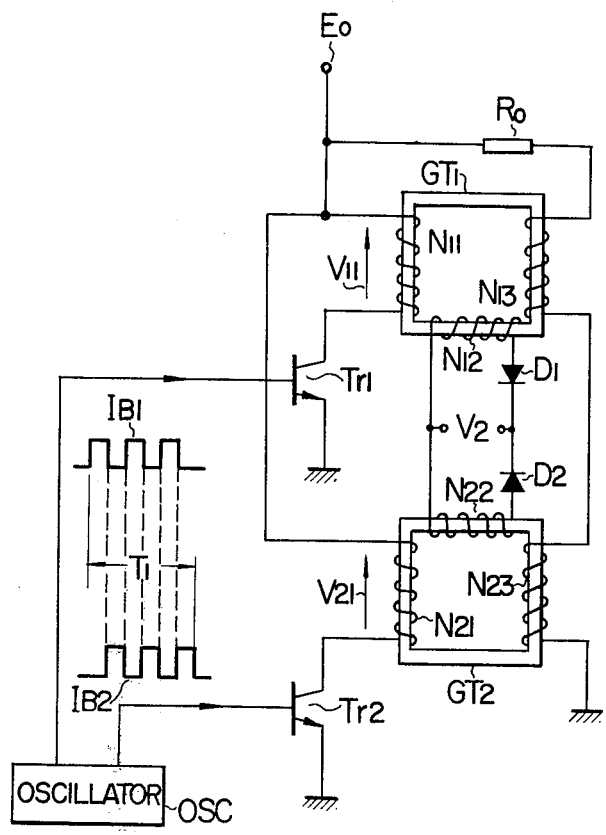
FIG. 17 is a view showing another particular embodiment of essential parts of the gate controller.

FIG. 17 shows another embodiment of the gate controller which takes into consideration the turn-off delay time of the transistor.

In FIG. 17, the same reference marks as those in FIG. 13 indicate corresponding elements. The arrangement in FIG. 17 differs from that in FIG. 13 in the point that in the former resetting windings $N_{13}$, $N_{23}$ of the gate transformers $GT_1$, $GT_2$ are connected in series.

With such an arrangment, the pulses from the oscillator OSC as mentioned above are applied to the bases of the transistors $Tr_1$ and $Tr_2$. The turning on of the transistor $Tr_1$ causes the line voltage $E_o$ to be applied to the primary winding $N_{11}$ of the gate transformer $GT_1$ with the voltage induced in the secondary winding $N_{12}$ thereof. Further the turning on of the transistor $Tr_2$ causes the line voltage $E_o$ to be applied to the primary winding $N_{21}$ of the gate transformer $GT_2$ with the voltage induced in the secondary winding $N_{22}$ thereof.

Figure 18:
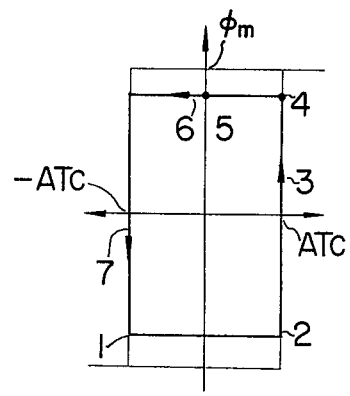
FIG. 18 is a diagram showing the magnetizing characteristic of the core of a transformer used in the invention.

IF the magnetic flux in the iron core of the gate transformer rests at a point 1 in FIG. 18 prior to the application of the voltage to the primary windings $N_{11}$ and $N_{21}$ of the gate transformers $GT_1$ and $GT_2$, then the magnetic flux is set to a point 4 through pathes 2, 3. The turning off of the transistor $Tr_1$ or $Tr_2$ causes the magnetic flux to arrive at a point 5. Then, the magnetic flux in the iron core must be returned to the point 1 before the transistor $Tr_1$ or $Tr_2$ is rendered conductive. The reason is that if the magnetic flux remains at the point 5, then it is saturated immediately upon the application of the voltage to the primary winding $N_{11}$ (or $N_{21}$) of the gate transformer GT, (or $GT_2$) and no voltage will be induced in the secondary winding $N_{12}$ (or $N_{22}$) thereof. The magnetic flux in the iron core can be restored to the point 1 by applying the voltage to the tertiary windings $N_{13}$, $N_{23}$ of the gate transformers $GT_1$, $GT_2$ to produce a magnetomotive force greater than the coersive force $AT_c$.

Figure 19:
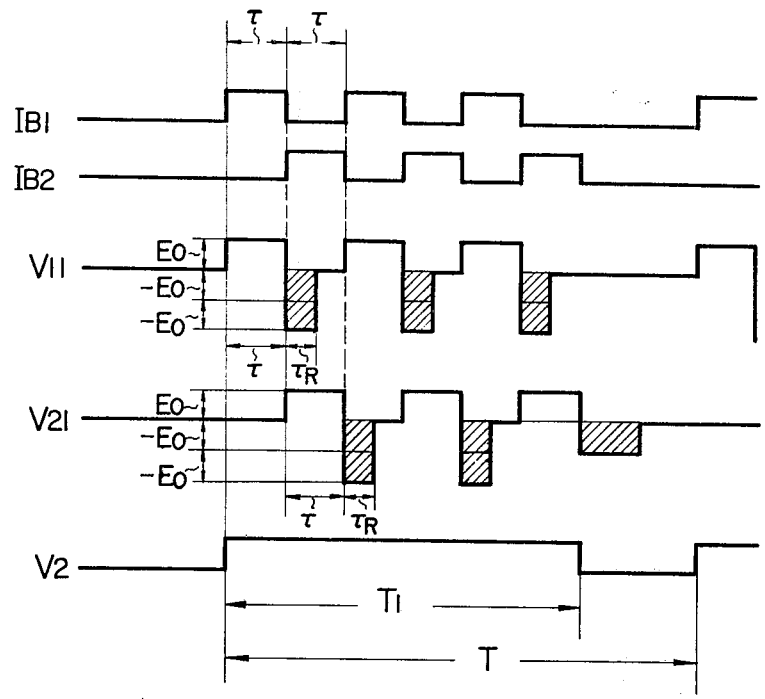
FIGS. 19 and 20 are views showing operational waveforms thereof.

Assuming that the turn ratios of the primary windings $N_{11}$ and $N_{21}$ of the gate transformers $GT_1$ and $GT_2$ to the tertiary windings $N_{13}$ and $N_{23}$ thereof are equal, then operational waveforms are as shown in FIG. 19.

The conduction of the transistor $Tr_1$ by the base current $I_{B_1}$ causes the line voltage $E_o$ to appear as the voltage $V_{11}$ across the primary winding of the gate transformer $GT_1$. The conduction of the transistor $Tr_2$ by the base current $I_{B_2}$ causes the primary winding of the gate transformer $GT_2$ to be supplied with the line voltage $E_o$. At this time, in the tertiary winding $N_{23}$ of the gate transformer $GT_2$ there is induced a voltage in the direction opposite to the voltage in the primary winding $N_{21}$, the magnitude of the voltage depending on the winding ratio of the primary winding $N_{21}$ to the tertiary winding $N_{23}$. The number of turns of the primary winding $N_{21}$ is equal to that of the tertiary winding $N_{23}$, so that the voltage induced on the tertiary winding $N_{23}$ becomes equal to the line voltage $E_o$, the direction being the same as that of $V_{23}$. When the transistor $Tr_2$ is rendered conductive, the resetting voltage, i.e., the voltage induced on the tertiary winding of the gate transformer $GT_1$ amounts to $2E_o$, namely, the sum of the line voltage $E_o$ and the voltage $E_o$ induced on the tertiary winding of the gate transformer $GT_2$ the direction of the voltage being opposite to that in the setting. The magnetic flux in the iron core is proportional to the product of the voltage by the time. The resetting voltage of $2E_o$ makes the resetting time $\tau_R$ to be $\tau/2$. In this respect, the resetting to the point 1 in FIG. 18 requires the resetting time of $\tau/2$ during which the magnetic flux in the iron core is saturated in the negative direction, and no voltage appears on the windings of the gate transformers $GT_1$ during the remaining time of $\tau/2$.

The resetting of the gate transformer $GT_2$ is effected by the voltage $2E_o$, i.e., the sum of the line voltage $E_o$ and the voltage $E_o$ induced on the tertiary winding $N_{13}$ of the gate transformer $GT_1$.

Such operations are repeated every time an output pulse from the oscillator OSC is applied to the bases of the transistors $Tr_1$, $Tr_2$.

The resetting voltage of the gate transformer $GT_2$ connected to the transistor $Tr_2$ which is operated by the last one of the oscillation pulses (the base current $I_{B_2}$ in FIG. 19) produced during the period when the output is generated from the phase shifter APPS amounts only to the line voltage $E_o$ because the voltage induced on the tertiary winding $N_{23}$ is zero as the gate transformer $GT_2$ is not in the set state. Consequently, the resetting time of $\tau$ is required. No practical diffculity, however, occurs because of a sufficient time corresponding to the commutation period of the chopper.

Figure 20:
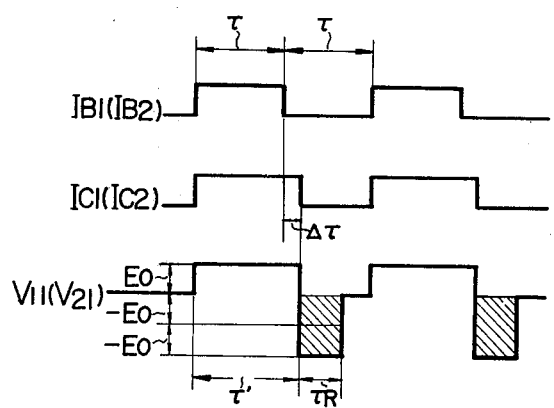

Thus, if the resetting is effected with the arrangement of the tertiary windings $N_{13}$, $N_{23}$ connected in series, then the voltage induced in the tertiary windings of the gate transformer during the setting tends to accelerate the resetting of the gate transformer which is being reset, thereby permitting the resetting time $\tau_R$ to be shortened. As a result, the turn-off delay in the transistor as shown in FIG. 20 causes no problem, the iron core being completely retuned to the reset state in a time of $\tau_R$.

As mentioned above, the two gate transformers are alternately driven, the outputs from which are added to produce the continuous gate pulses. Consequently, the gate transformer may be of small capacity, so far as it has the required product of the voltage by the time.

In the above, the description has been made of the gate controller permitting the generation of the continuous gate signals. Thus, it is possible to effect the smooth regenerative braking without being affected by the non-uniformness of the latching characteristics in the thyristor element, by applying the continuous gate signals to the main thyristor of the chopper.

Figure 21:
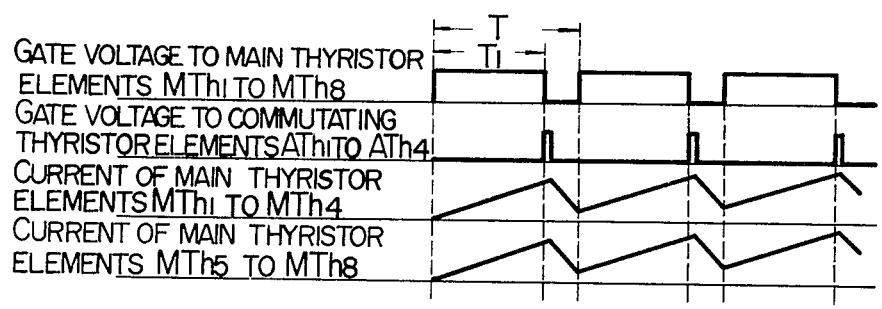
FIGS. 21 and 22 are views showing operational waveforms of the chopper controlled according to the present invention.

FIG. 21 shows operational waveforms obtained when the two circuits including the main thyristors MTh of the chopper CH are connected in parallel as shown in FIG. 7. The application of the gate pulses during, the period of time when the chopper should be rendered conductive, ensures the equally divided flow of current to the two branch circuits.

Figure 22:
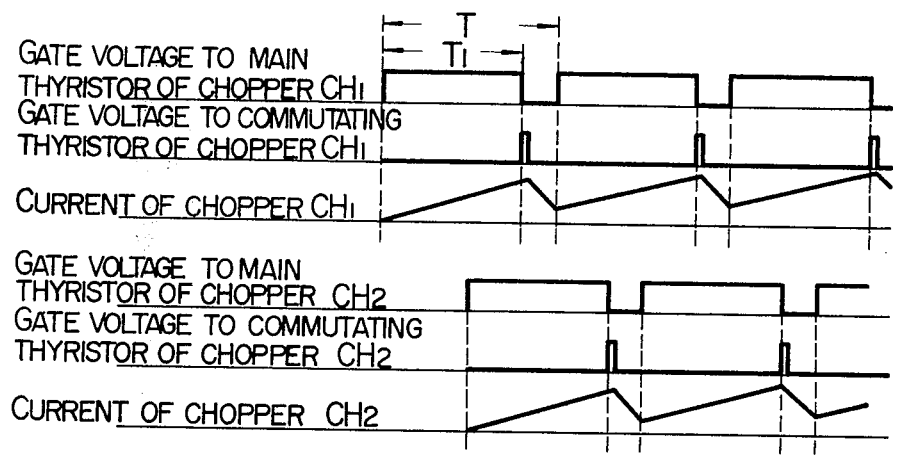

Further, FIG. 22 shows operational waveforms obtained when the two choppers are employed as shown in FIG. 9. Also in this arrangement, the equally divided flow of current to the two choppers is assured.

As mentioned above, the present invention is intended to apply a continuous gate signals during the period of time when the chopper is to be rendered conductive in effecting the regeneration braking for the DC electric motor which is controlled by the thyristor chopper, and assures that thyristors of the chopper are ignited, thus permitting the smooth regenerative braking.

Further, since two gate transformers are employed in the gate controller and are alternately driven for generation of the pulse outputs, the sum of which is used as the gate signal, a small product of the voltage by the time in the gate transformer and accordingly use of small-sized gate transformers are allowed.

It will be apparent that the gate signals may be applied continuously during the period of time when the chopper is to be rendered conductive also in the accelerating operation of the DC motor, although the description has been made of the regenerative braking of the DC motor.

What we claim is:

1. A regenerative braking controller for use with a DC motor, comprising a series-connected circuit including an armature of the DC motor, a field winding thereof and a smoothing reactor; a thyristor chopper connected in parallel with said series-circuit and including at least a main thyristor and a commutation thyristor for turning off said main thyristor; a diode connected between said parallel circuit and a power supply; and a gate controller means for applying a gate signal to the gate of said main thyristor continuously during the period of time when said chopper is to be conductive and applying a pulse signal to the gate of said commutation thyristor at the end of said period of time.

2. A regenerative braking controller for use with a DC motor as set forth in claim 1, further comprising an auxiliary excitor for energizing said field winding at the beginning of the regenerative braking cycle.

3. A regenerative braking controller as set forth in claim 1, wherein said gate controller means comprises two gate transformers each including an input coil, an output coil and a resetting coil; two sets of series-connected circuits each including a switching element and said input coil of the gate transformer connected to a DC power supply; a series-connected circuit including an impedance element and said resetting coil connected to said DC power supply; control means for alternately turning on and off the switch elements of said two sets of series-connected circuits; and an output circuit for summing logic outputs from said two gate transformers.

4. A regenerative braking controller as set forth in claim 1, wherein said gate controller means comprises a phase shifter means for providing outputs during a period of time when said chopper is to be rendered conductive depending on a deviation of motor current from an instructed value of current, and an oscillator means for generating pulses during the time when said phase shifter means produces said outputs.

5. A regenerative braking controller as set forth in claim 3, wherein said resetting coils of the two gate transformers are connected in series.

6. A regenerative braking controller as set forth in claim 3, wherein said impedance element is a resistor.

7. A regenerative braking controller as set forth in claim 3, wherein said switching element is a transistor.

8. A regenerative braking controller as set forth in claim 3, wherein said output circuit is constituted by a diode.

* * * * *